Patented Feb. 14, 1928.

1,659,132

UNITED STATES PATENT OFFICE.

EDWARD COFFMAN, OF DES MOINES, IOWA.

PROCESS OF MAKING FISH BAIT.

No Drawing.   Application filed September 7, 1926.   Serial No. 134,140.

The purpose of my invention is to provide a fish bait made of materials so combined and treated as to be especially attractive for fish, especially cat fish.

A further object is to provide such a bait, which can be stored in suitable tight containers and which will retain its quality for a considerable period of time.

Still another object of the present invention is to provide a method, whereby a bait of the kind mentioned above can be made.

I will now explain the method of preparing my improved fish bait and in connection with this explanation will set forth the ingredients of the bait and the relative proportions thereof and the manner of preparing and mixing them.

In making my bait, I use clams, preferably of the fresh water variety. The clams are taken from the shell and cut into strips, each of which is as nearly as possible of proper size for one bait. The smaller pieces are, however, employed in the manner hereinafter mentioned.

The clams are mixed in a suitable container with salt, sugar and extract of ginseng. The ingredients are preferably mixed by stirring and corn meal is fed slowly to the mixture.

The completed product is allowed to stand for about one day.

The accumulated liquid or liquor is then drawn off and the product is permitted to stand for about another day. The day referred to here is a period of twenty-four hours.

After the second day, the liquid is again drawn off and the bait is ready for packing or use.

The strips of clam of the size suitable each for a bait are packed in suitable tight containers and are then ready for use.

The smaller pieces of clam are mixed with flour in sufficient quantity to make a dough bait. The dough bait is then packed into suitable containers and when used a sufficient amount for one bait can be taken out at a time.

The relative quantities or proportions of the ingredients as above prepared and used are substantially as follows by weight: clams 6 pounds, salt ¼ pound, sugar ½ pound, extract of ginseng ⅕ ounce, corn meal 1½ pounds.

It will be understood that these proportions may be varied somewhat, but I find that approximately the proportions given make a very satisfactory bait.

This bait I find in practice is particularly attractive to cat fish.

It is my purpose to cover by the claim of my patent any variation in the proportions of the ingredients and any variations in the steps of the process as above set forth, which may be reasonably included within the scope of such claim.

I claim as my invention:

The process of preparing a fish bait, comprising the cutting of the clams into strips, mixing them with salt, sugar, extract of ginseng and corn meal in substantially the proportions of six pounds, one-fourth of a pound, one-half of a pound, one-fifth of an ounce, and one and one-half pounds, permitting the product to stand in the open air for approximately twenty-four hours, drawing off the liquid, permitting the product to stand for approximately another twenty-four hours and again drawing off the liquid.

Des Moines, Iowa, August 10, 1926.

EDWARD COFFMAN.